Aug. 10, 1965
G. E. SLEIGHTER ETAL
3,199,401
METHOD AND APPARATUS FOR OPTICALLY DETECTING
ELONGATED DEFECTS IN GLASS
Filed Nov. 2, 1959
6 Sheets-Sheet 1
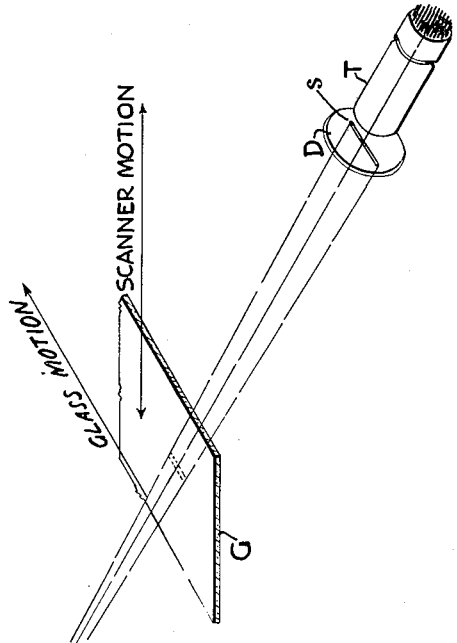
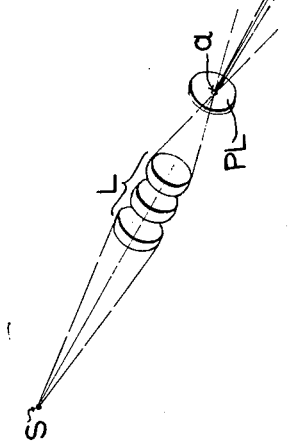
INVENTORS
GEORGE E. SLEIGHTER and
JOSEPH S. ZABETAKIS
BY
Oscar H. Spencer
ATTORNEY

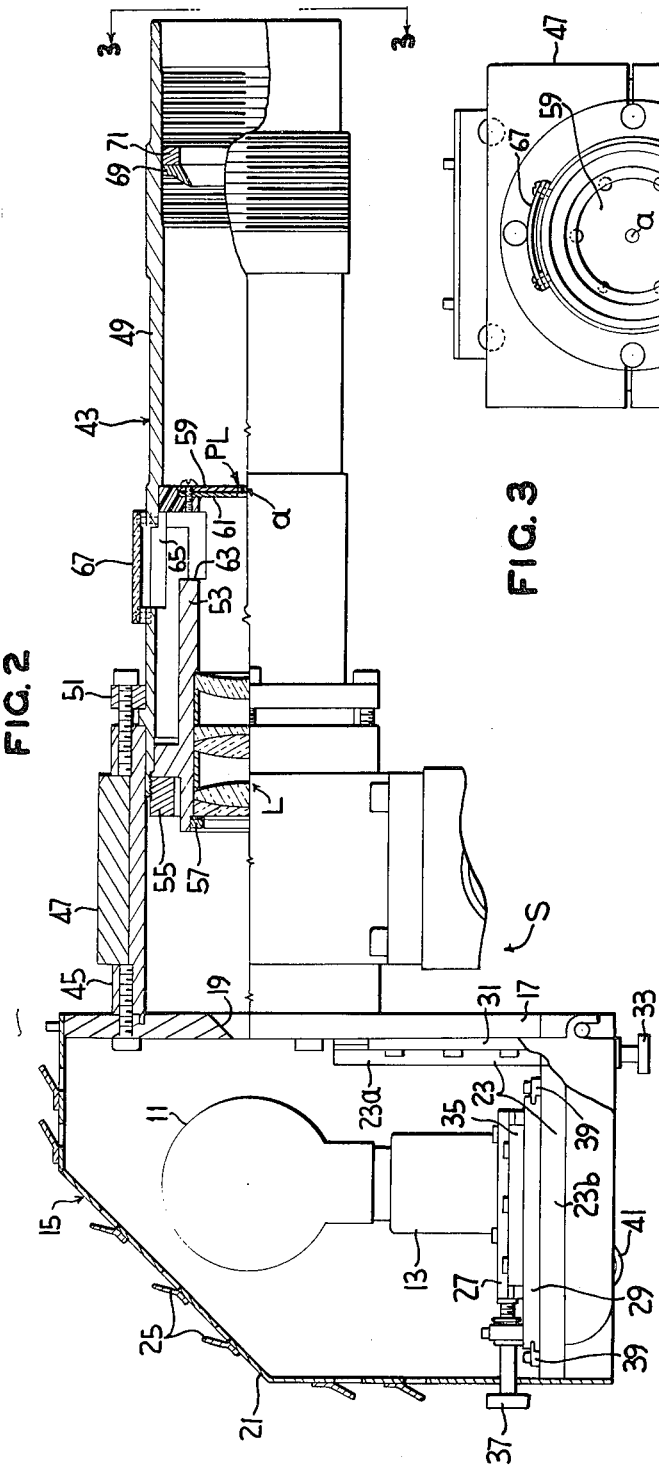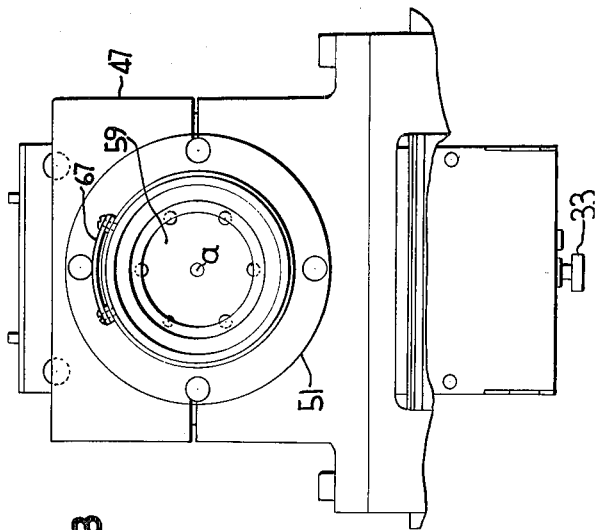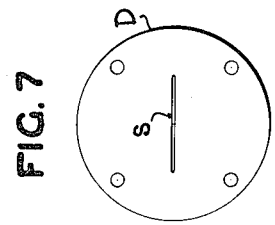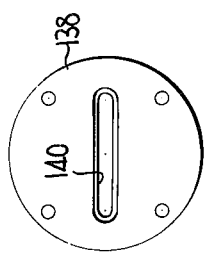

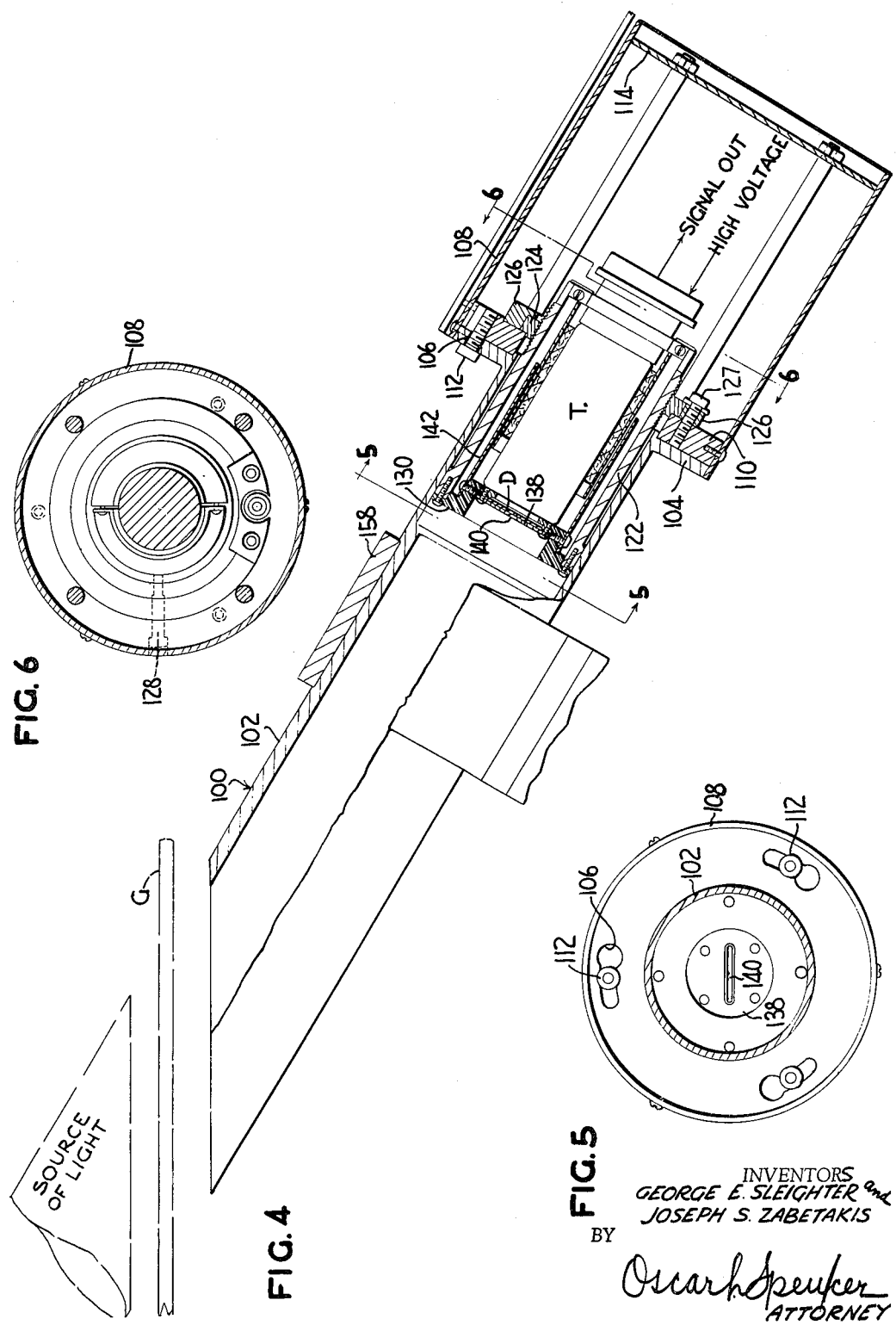

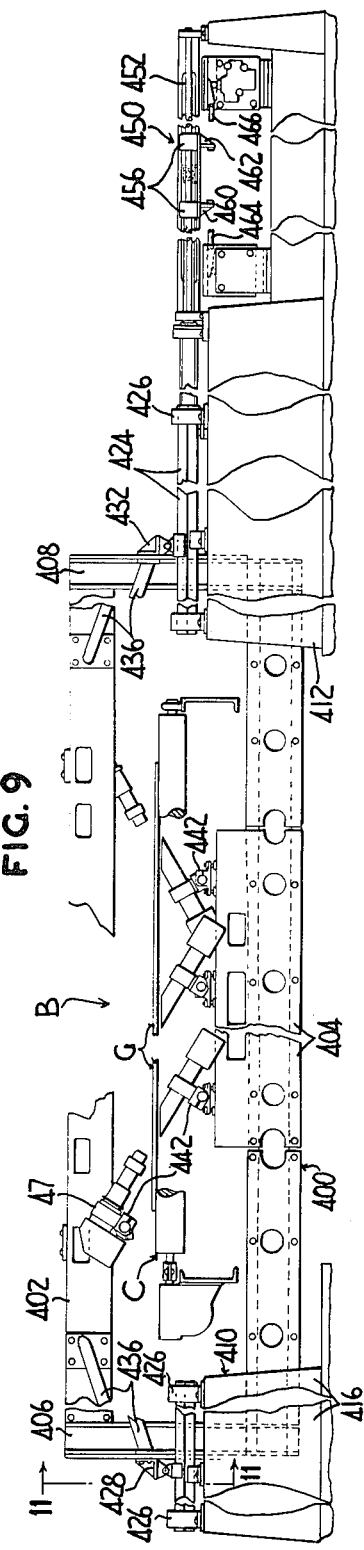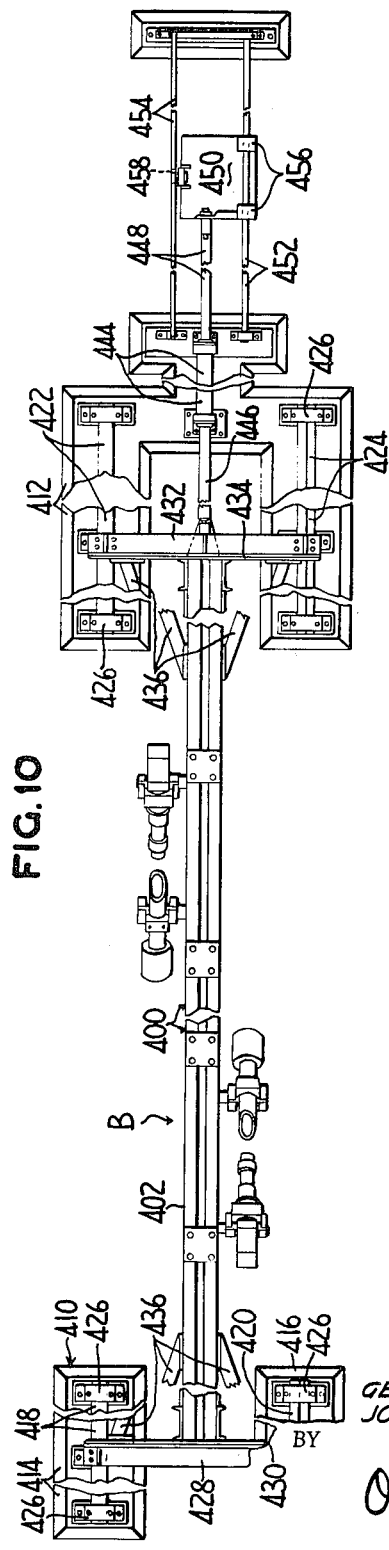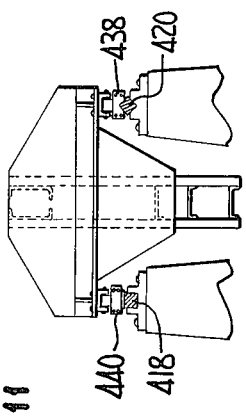

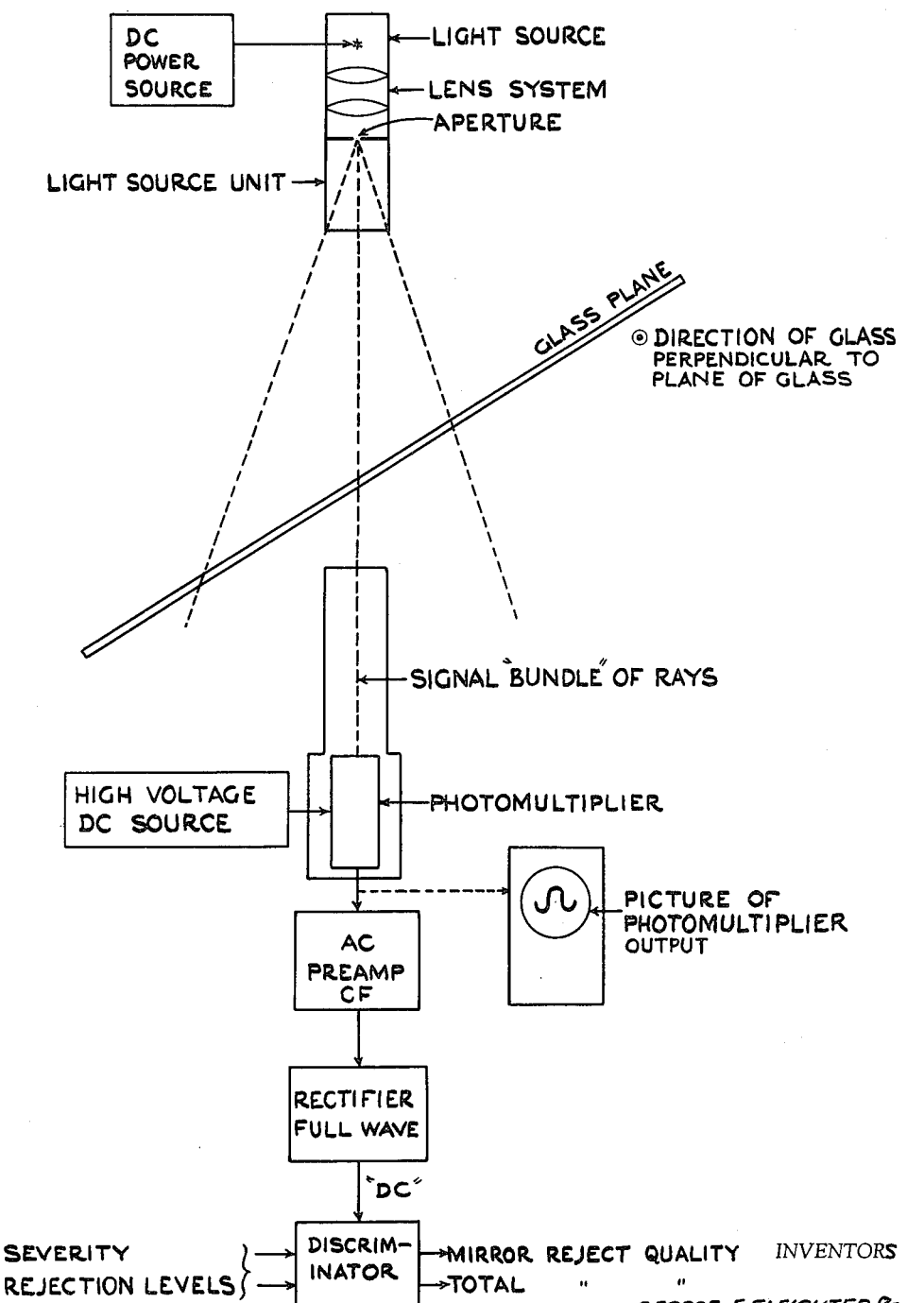

3,199,401
METHOD AND APPARATUS FOR OPTICALLY DETECTING ELONGATED DEFECTS IN GLASS
George E. Sleighter, Natrona Heights, and Joseph S. Zabetakis, Arnold, Pa., assignors to Pittsburgh Plate Glass Company, a corporation of Pennsylvania
Filed Nov. 2, 1959, Ser. No. 850,312
21 Claims. (Cl. 88—14)

This invention relates to the inspection of polished plate gass in order to locate various defects whose presence impairs its optical and mechanical perfection.

Glass manufacturers attempt to produce polished plate glass sheets, without defects, having planar surfaces in perfect parallelism with each other. Unfortunately, plate glass as produced today falls short of this ideal. However, as various grades of plate glass are required for various purposes, certain defects, if not too severe, may be permitted. For example, highest quality mirror glass has optical requirements far in excess of those necessary for commercial plate glass, so that while certain, not severe, defects may be permitted in plate glass for high quality mirrors, other defects causing rejection of a silvered mirror are acceptable for commercial plate glass.

There are four types or families of defects which frequently may be present in the body of or on the surface of polished plate glass sheets and which mar the optical properties of polished plate glass sufficient to be discerned by the human eye.

The first family of defects, referred to as Type A defects, are microscopic surface defects. These defects are not localized, but are distributed over relatively wide areas of the glass surfaces. Such defects susceptible of discernment are sweep, peel and short finish.

Sweep, a defect generally attributed to improper polishing, is characterized by a plurality of parallel, arcuate, shallow grooves of smoothly varying depth, and possesses a comparatively regular pattern having a modified sinusoidal elevational configuration across a section of glass. The width of such grooves generally varies from about 200 to about 800 microns, and the greatest depth varies from about 0.1 to about 0.2 microns.

Peel is characterized by irregular variations on the surfaces of plate glass, or non-planar elemental areas not lying in the same plane as the gross surfaces of the glass, and take the form of irregularly dispersed, shallow pits having rounded edges and rounded bottoms. While polished plate glass should be optically flat or have a focal length of infinity, these elemental areas perform optically as minute lens and have a distribution of focal lengths less than infinity. The width of such pits varies from about 200 to about 800 microns and the depth varies from about 0.1 to about 2 microns.

Short finish, resulting from incomplete polishing, characterizes glass having elemental areas that have not been polished completely to the plane of the gross surface of the glass. The surface is pitted with sharp, irregularly surfaced indentations scattered through the surface. The depth of short finish pits varies generally from about ½ to about 10 microns, and the width from about 2 to about 40 microns.

The second family of defects, referred to as Type B defects, exist within the body of polished plate glass and result from incomplete blending of the various batch ingredients during the glass melting and fining operations and extend generally in the direction of the draw of the glass. These defects are strings, striae, and ream. When the inhomogeneities are oriented so that their length is aligned with the direction of glass draw and the planes of inhomogeneities are generally normal to planes of glass surfaces, the defect is called stria. When the inhomogeneities are aligned so that their major axes are oriented to extend in planes parallel to the glass surfaces, the defect is called ream. Strings are relatively thin, elongated, straight or gradually curled lines resulting from a slow solution of a large grain of sand or foreign material. While pure ream does not affect the optical properties of a glass sheet viewed normal to its surface, striae or any orientation of inhomogeneities containing a stria component of certain magnitude impairs the optical perfection of polished plate glass. All of these enumerated defects should be detected before any local area containing these defects are included in a large plate glass sheet.

A third class of defects, referred to as Type C defects, are those of the point type, which may be within the glass, i.e., of the inclusion type, or may be present at the surface of the glass. Inclusion type defects include stones, boils, blisters and seeds. Stones are solid inclusions of refractory material that have failed to melt into the glass, or are formed as a consequence of glass manufacture. Boils and seeds are gaseous inclusions, seeds being on the order of $\frac{1}{10}$ to ½ millimeter in diameter and boils being larger. Blisters are elongated boils, usually being a fraction of a millimeter wide and several millimeters long. Surface point type defects include sand holes, and bloach. Sand holes are small fractures in the surface produced from the rough grinding operation, which have not been removed by subsequent fine grinding, and are generally 40 to 1000 microns wide and about 10 to about 250 microns deep. Bloach may consist of groups of sand holes as a result of incompletely fine grinding plate glass, caused by a low place in the plate which retains part of the original rough surface.

The fourth type of defects, generally referred to as Type D defects, are gross linear surface defects, broadly classified into scratches and sleeks. Scratches, usually a linear or arcuate series of conchoidal fractures are long, deep, narrow defects in the glass surface having lengths varying from millimeters to meters, widths up to about a millimeter and depths on the order of hundreds of microns. Scratches are known under various names, such as block rakes, cullet cuts, runner cuts, and deck scratches, depending upon their origin.

Sleeks are very fine, smooth walled indentations in a glass surface, usually produced by a foreign particle in the polishing operation. Their lengths may vary from millimeters to meters, their width from about 10 to about 100 microns, and their depth from about ½ to 2 microns. Donut marks may be catalogued with either sleeks or scratches, depending upon their severity.

Usually plate glass, after being ground and polished, is manually and visually inspected for the presence of the various defects described which affect its optical and mechanical properties and the inspectors mark the defect locations with chalk or crayon. This procedure is time consuming and requires a large number of specially trained personnel and, due to differences of opinion between the inspectors, leads to a lack of uniformity in the grading of glass.

It is proposed, according to the teachings of this application and the copending applications of Hugh E. Shaw, Jr.; William F. Galey, Hugh E. Shaw, Jr., and George E. Sleighter, Serial Numbers 850,347 and 850,304, respectively, all filed concurrently herewith, to provide methods and apparatus for automatically inspecting ground and polished plate glass, each application being directed to a method and apparatus for automatically inspecting the glass for one or more of the families or types of defects before enumerated. Automatic inspection, as opposed to visual inspection, provides for the establishment of uniform standards for the grading of the glass into the particular required qualities and may be accomplished while the glass is moving along a continuous line either in the form of discrete sheets or a continuous ribbon from the grinding and polishing stations to stations where the sheets or ribbon are cut into smaller commercial size sheets. A factor of great importance in such an operation is that the glass need not be removed from the line for inspection as is the usual situation when the glass is manually inspected, thus providing a more continuous manufacture of the sheets of plate glass.

To determine the manner of cutting the glass into small sized sheets the polished plate glass is passed, while on a continuous line, through a series of detectors, each capable of distinguishing a different type or family of optical defect. Means may be associated with each detector whereby an electrical signal indicating each defect detected is fed into a recording or defect storage device and a computer which determines the optimum manner of cutting the glass to remove the various imperfections detected, or into a marking device which marks each defect directly on the glass, so that a cutter may determine the optimum manner of cutting the glass.

The instant application is specifically directed to a method and apparatus for detecting defects of the before-mentioned Type B.

A shadowgraph is produced when light from a point source intersects glass and impinges on a screen. This shadowgraph, when defects of the mentioned Type B are present in the glass, will have areas of a light intensity higher than the normal background and areas of a light intensity lower than the normal background. The areas of the different light intensities are caused by the refraction of light by the defects of the type described. The refraction of light is caused by inhomogeneities of index of refraction contained in the glassy matrix due to the Type B defects.

Broadly, the device of this invention utilizes the shadowgraph principle, replacing the screen with a device that stops the light except for a controlled aperture preferably in the form of an elongated slit longitudinally aligned with the direction of glass draw and having relative movement transversely of the glass. The dimensions of the slit $s$ are chosen to provide discrimination between the Type B defects and the other types of defects. In other words, the width of the slit $s$ is selected to maximize the relative modulation due to Type B defects. The length of the slit $s$ is selected to permit integration of a sufficient number of light and dark areas indicative of Type A defects such that their modulating effects contribute negligibly to the overall intensity. Relative movement is to detect the changing modulation of light intensity. The slit allows light of the modulated intensities to pass therethrough, so as to impinge on a light sensitive element preferably a photomultiplier tube which converts the modulated intensities into electrical energy of varying amplitudes and frequency proportional to the light impinging on the tube. Electrical circuitry is associated with the photomultiplier to provide the signals in a usable form.

Therefore, the primary object of this invention is the provision of an apparatus for automatically inspecting ground and polished plate glass for determining the location of defects therein of the aforementioned Type B.

Another object of this invention is the provision of an improved method for inspecting ground and polished plate glass for the location of defects therein of the aforementioned Type B.

These and other objects and features of the invention will become apparent from the following description when taken with the following drawings in which:

FIG. 1 is a ray diagram of the inspection device of this invention illustrating some of the mechanical parts and their relation to the path of movement of the glass;

FIG. 2 is an illustration, partly in section, of the light source and associated structure of the inspection device of this invention;

FIG. 3 is a view taken on line 3—3 of FIG. 2;

FIG. 4 is an illustration, partly in section, illustrating the elongated slotted disc photomultiplier tube, associated mechanisms and the housing for these components;

FIG. 5 is a section taken on line 5—5 of FIG. 4;

FIG. 6 is a section taken on line 6—6 of FIG. 4;

FIG. 7 is a view of the slotted disc;

FIG. 8 is a view of the backup plate for the disc shown in FIG. 7.

FIG. 9 is a broken side view of a mounting bridge and illustrating the manner of mounting inspection devices constructed in accordance with this invention adjacent the path of movement of the glass;

FIG. 10 is a plan view of the structure shown in FIG. 9;

FIG. 11 is a view taken on line 11—11 of FIG. 9;

FIG. 12 is a schematic of the hydraulic system for reciprocating the bridge illustrated in FIGS. 9 to 11;

FIG. 14 is a block diagram of the light source, scanning device and electrical circuitry to provide electrical signals indicating defect severity.

Figure 13:
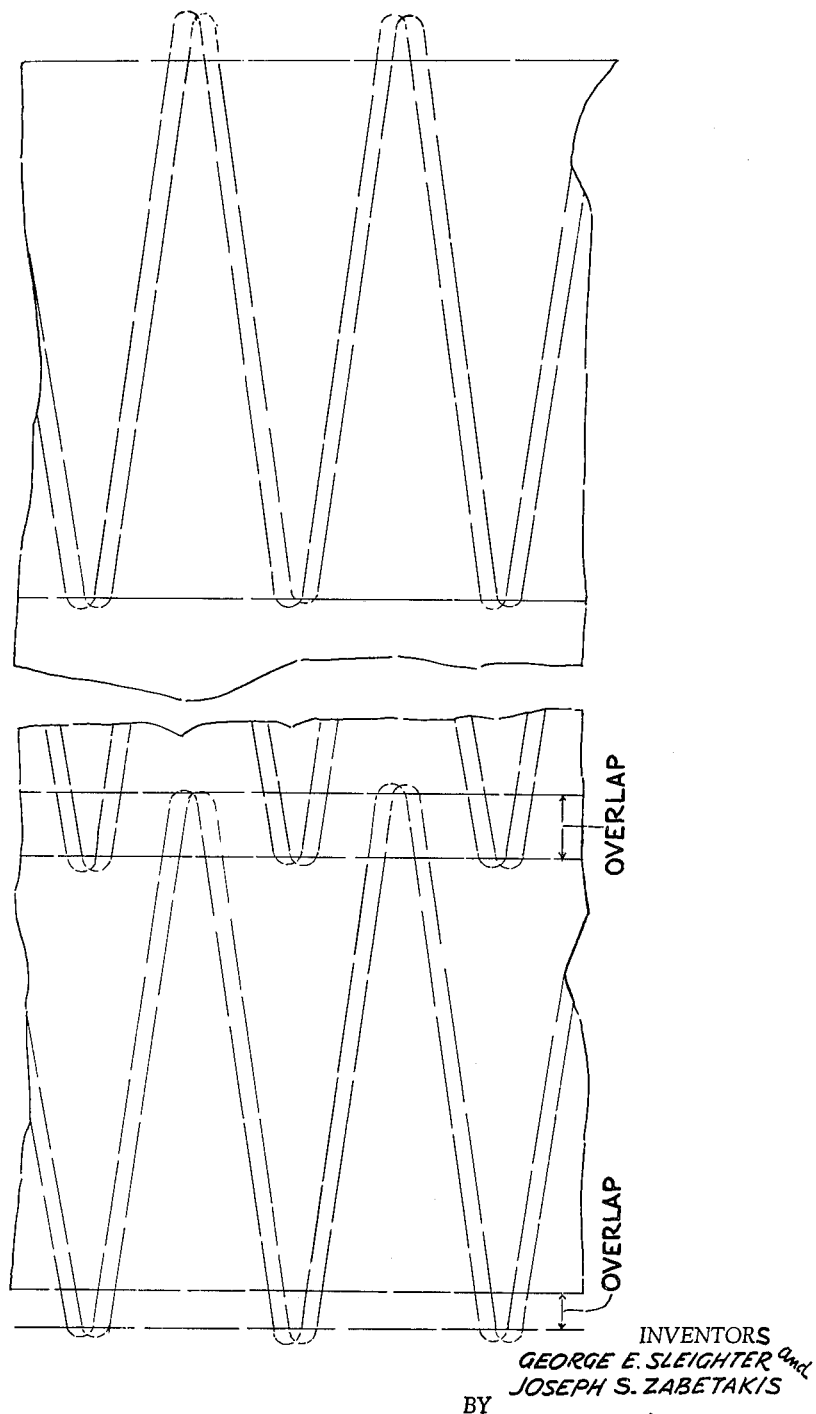
FIG. 13 is an illustration of the scanning pattern of a device constructed in accordance with the teachings of this invention.

Looking at the drawings and in particular to FIG. 1, illustrating the ray diagram, we see from left to right, a source of light identified as S, a lens system L for forming an image of the original light source in the plane of an apertured plate PL. The aperture $a$ of plate PL now serves as a point source to serve this inspection device to be described. The light source, lens system and plate are disposed on one side of a sheet or ribbon of glass G. Preferably, the glass moves in a path indicated by an appropriate legend and arrow. The optic axis of the light beam passes through the glass, preferably at an angle of approximately 60 degrees thereto. This angle has been chosen to enhance the modulation effects caused by Type B defects. Other angles may be used without departing from the spirit of this invention so long as the light intersects the glass. On the other side of the glass plane there is disposed a disc D having a narrow elongated slit $s$ therein longitudinally aligned with the direction of draw of glass G and a light sensitive element, such as a photomultiplier tube T. Relative motion of the glass G and the slit $s$ provide a scanning of the glass.

*Light source*

Turning now to FIGS. 2 and 3 showing the structural details of the light source S and associated parts which are disposed on one side of the glass, from left to right, there is the source of light S taking the form of a lamp or bulb 11 chosen for its characteristic of intrinsic brightness with its base received within a socket 13 connected to a source of regulated electrical power (not shown). The socket 13 and the bulb are adjustably positioned within a lamp housing 15 which includes a front plate 17 having an aperture 19 with a tapered wall therethrough for the passage of light from the bulb, a cover 21 and an L-shaped base plate 23 having legs 23a and 23b. The adjustability of the position of the lamp 11 allows proper focusing of its rays, as will be later explained. The cover 21 is provided with a plurality of louvres 25 for the dissipation of heat from the bulb 11. The socket 13 is fixed to a plate 27 and a plate 29 is interposed between the plate 27 and the leg 23b of the base plate 23.

The leg plate 23a of the base plate 23 is slidably received within a pair of spaced, parallel guide tracks 31 (only one of which is shown) fixed to the front plate 17 and extending vertically, as viewed in the drawing. An adjusting screw 33 having a portion of its length rotatably fixed to the front plate 17 and a portion of its threaded length received within a threaded portion of the base plate 23 is provided for adjusting the position of the base plate 23 relative to the front plate 17. Upon rotation of the screw 33, as is obvious, the base plate 23 is moved in the tracks 31 and relative to the front plate 17. The plate 27 is slidably received within spaced, parallel guide tracks 35 (only one of which is shown) fixed to the plate 29 and extending from front to back relative to the housing 15. An adjusting screw 37, mounted in a manner similar to the screw 33 provides a means for adjusting the front-to-back position of the lamp 11 relative to the housing 15. The plate 29 is slidably received within spaced, parallel guide tracks 39 fixed to the leg 23b of the base plate 23 which extend from side-to-side relative to the housing 15. An adjusting screw 41, mounted in a manner similar to the screw 33, provides a means for adjusting the side-to-side position of the lamp 11 relative to the housing 15.

An elongated tubular assembly 43 is connected to the lamp housing 15 and is positioned so as to be concentric with the aperture 19 in the front plate 17. The tubular assembly 43 is constructed in two parts, namely, a first tubular element 45 having a reduced center portion to receive a mounting bracket 47 by which the light source S is attached to a support means for use, as will later be explained, and a second elongated tubular element 49 rigidly connected to the first element 45 by a clamp ring 51 and bolts, as illustrated.

A substantially cylindrical lens holder 53 is fixed within the element 49 by an annular retaining nut 55 threadably received within the element 49 adjacent one of its ends. The condensing lens system L is properly positioned and fixed within the lens holder 53 by a lock nut 57. The lens system L is preferably of multiple element construction for imaging the light source at the apertured plate PL (see FIG. 1). The plate PL having the center aperture $a$, being extremely thin, is positioned between a pair of thicker support plates 59 and 61, each having relatively large central apertures therethrough. The aperture $a$ preferably on the order of 0.030 inch diameter becomes the effective point source of light for the device being described. The assembly of support plates 59 and 61 and aperture plate PL is connected to the lens holder 53. The lens holder 53 is formed with an opening 63 which when properly positioned is aligned with an opening 65 formed in the tubular member 49. A transparent cover plate 67 for the opening 65 is attached to the element 49. The openings 63 and 65 provide a means whereby the proper positioning of the bulb 11 with the rays of light focusing at the aperture $a$ may be visually determined. The means for positioning the bulb 11 has been previously described. The elongated tubular element 49 is internally threaded adjacent its free end to threadably receive a reflection stop member 69 secured in the desired position by a lock nut 71. To prevent reflection of light within the tubular assembly 43 its interior is preferably optically threaded throughout its length and provided with a non-reflective coating.

Scanning device

Attention is now directed to FIGS. 4 to 9 wherein the structure positioned on the other side of the glass path carrying the photoelectric tube and other elements is illustrated. Looking at FIG. 4 from left to right (a direction away from the glass plane) the structure includes a tubular housing 100 comprising a first elongated tubular part 102 having an outwardly extending flange 104 provided with spaced key shaped openings 106 (see also FIG. 5) and a second tubular part 108 of a diameter greater than the first tubular part. The tubular part 108 is attached to an annular base plate 110 having headed bolts 112 receivable in suitably spaced bores and extending therefrom. The headed bolts 112 are receivable in the spaced openings 106 to provide a means for connecting and disconnecting the tubular parts 102 and 108. The tubular part 108 is closed at its terminal end by a removable cover plate 114 spaced from the base plate 110 as illustrated.

The first tubular part 102 at its free end is beveled, so that the lip of the part is parallel to the plane of the glass G when the assembly is positioned for use (see FIG. 4).

The photomultiplier tube T is positioned within the tubular part 102 by being received within a tube holder 122 slidably received within the part 102. The tube holder 122 is provided with an outer threaded portion to receive an annular adjusting nut 124 by which the axial position of the tube T may be adjusted. A ring 126 connected to the base plate 110 has socket head screws 127 passing therethrough which clamp the nut 124 and fixes the tube T in the tubular part 102. By loosening the screws 127, changing the position of the lock nut and then tightening the screws, the axial position of the tube T may be adjusted. A key or screw 128 (see FIG. 6) is received within a bore in the base plate 110 and has an eccentric portion contacting an elongated slot in the tube holder 122 for accurately aligning the slit $s$ with the direction of glass draw and for holding the tube holder against rotation while allowing its axial positioning.

An annular member 130, constructed of an insulating material, such as nylon or the like, is attached to the tube holder 122 and assists in positioning the tube T. The member 130 also functions as a disc support to which the disc D with its narrow elongated slit $s$ (see FIG. 7) and a thicker support plate 138 with a slot 140 therethrough (see FIG. 8) are fixed. A shield 142 constructed preferably of mu-metal is attached to the member 130 and surrounds the tube T. A felt sleeve surrounds the tube T within the shield 142. The electrical connections of the photomultiplier tube T will be later described.

A bracket 158 surrounds the tubular part 102 for attaching the device to a bridge for operation, as will be explained.

Mounting bridge

Attention is now directed to FIGS. 9, 10 and 11, illustrating a bridge, generally identified as B, on which the described light source and scanning device are mounted, the bridge being constructed to extend and reciprocate transversely of the glass. The reciprocation of the bridge B and therefore of a scanning assembly of light source and scanning device mounted thereon provide, with the movement of the glass, a scanning pattern such as shown in FIG. 13, to which later reference will be made. Because of mechanical considerations, for example the stroke of the bridge B, there are a plurality of scanning assemblies mounted on the bridge.

The bridge B comprises a substantially rectangular framework 400 constructed of structural members which include an upper member 402, a lower member 404 and vertical end members 406 and 408. The framework 400, as previously stated, extends transversely of the glass and is arranged so that the glass is conveyed, as by a conventional conveyor C, through the framework 400.

Adjacent the end of the framework 400 there are support bases 410 and 412 upstanding from the floor of the building in which the structure is housed. The base 410 is constructed of spaced parts 414 and 416, and the base 412 is substantially Y-shaped in plan. Spaced, parallel guide rods 418 and 420 are fixed to the base parts 414 and 416, respectively, and spaced, parallel guide rods 422 and 424 are fixed to the base 412. The rods 418 and 422 are square in section and the rods 420 and 424 are diamond-shaped in section, as indicated in FIG. 10. Means 426 are provided for mounting each of the guide rods 418, 420, 422 and 424 on the respective base parts.

A structural cross member 428 and a plate 430 are connected to the member 406, and a structural cross member 432 and a plate 434 are connected to the member 408. Reinforcing rods 436 connect the member 402 and the plates 430 and 434. Notched slides 438 are connected to each of the cross members 428 and 432, so as to be slidable along the diamond-shaped rods 420 and 424, and flat-based members 440 are connected to the opposite ends of the cross members 428 and 432, so as to be slidable along the rods 418 and 422. This arrangement allows ease of alignment and also transverse expansion and construction of the bridge 400 without affecting its operation.

As illustrated in the drawing, the light source S and associated parts are connected by means of the bracket 47 to the member 402 and disposed to provide light rays angularly directed to the plane of the glass G. The structure housing the light sensitive element and slit plate PL are connected to the member 404 by the bracket 158. Split clamps 442 provided for the accurate positioning of the scanning devices with respect to their respective light sources to insure coincidence of the optic axes.

A double acting hydraulic cylinder 444 fastened to the 412 is provided for reciprocating the bridge B and the scanning devices transversely of the glass G. The hydraulic cylinder 444 and the hydraulic system to be further described provide a desired, controlled motion of the bridge B and the attached detecting devices. One side of the piston of the cylinder 444 is connected by a rod 446 to the cross member 432 and the plate 434, and the other side of the piston is connected by a rod 448 to a movable rod support assembly 450.

The support rod assembly 450 is guided in its movement by spaced, parallel guide rods 452 and 454 of round and square cross section, respectively, connected to the support base 412. The support rod assembly 450 is constructed to have portions 456 encompassing the rod 452 and a connected roller or slide 458 which rolls or slides on the rod 454. Depending from the assembly 450 are a pair of spaced actuators 460 and 462 adapted to cooperate with switch means 464 and 466 of a hydraulic system H, illustrated schematically in FIG. 12.

The hydraulic system H includes a source of fluid, such as a sump 468, a fluid pressurizing means, such as a pump 470, a spool valve 472, solenoids 474 and 476 to actuate the spool, and the double acting cylinder 444. The switches 464 and 466, upon being actuated by the actuators 460 and 462, energize the respective solenoids 474 and 476 and cause actuation of the spool valve, as explained below.

The double acting cylinder 444 is provided with ports 478 and 480 adjacent its ends, and the valve 472 comprises a housing 482 having ports 484, 486, 488, 490, 492 and 494, the ports 488 and 494 being bleed ports as is necessary in the valve construction illustrated. The value 472 is provided with a spool 496 having spaced parallel bores 498 and 500 and crossed but not intersecting bores 502 and 504. Opposite ends of the spool 496 are connected to the cores of the solenoids 474 and 476. The port 478 is connected to the port 484; the port 480 is connected to the port 486; the port 490 is connected to the outlet of the pump 70 whose inlet is connected to the sump 468; and the port 492 is connected to the sump 468.

When the actuator 462 actuates the switch 466, the solenoid 476 is energized and the solenoid 474 is deenergized. The spool 496 is thereby moved to the right, so as to connect the ports 484 and 492 by means of the bore 498 and the ports 486 and 490 by means of the bore 500. Fluid under pressure from the pump flows through the port 490, the bore 500, the port 486 and the port 480 into the right end of the cylinder 444. Fluid is discharged from the left end of the cylinder through the port 478, the port 484, the bore 498 and the port 492 to the sump 468. The piston of the cylinder 444 is thereby moved to the left which also causes the bridge B to so move. The switch 466 is deenergized which also causes the solenoid 476 to be deenergized, but with the solenoid 474 also deenergized, the spool 496 because of its construction remains in its moved position. When the assembly 450, connected to the piston of the cylinder 444 moves to the left, the actuator trips the switch 464 which energizes the solenoid 474 thereby moving the spool 496 to the left and connecting the ports 484 and 490 by means of the bore 504 and the ports 486 and 492 by means of the bore 502. Fluid under pressure is supplied by the pump 470 through the port 490, the bore 504, the port 484 and the port 478 into the left end of the cylinder 444. Fluid is discharged from the right end of the cylinder 444 through the port 480, the port 486, the bore 502 and the port 492 to the sump 468. Thus, the piston of the cylinder 444 is moved to the right thereby reciprocating the bridge B in the opposite direction. The operation is repeated with the actuator 462 tripping the switch 466, the actuator 460 tripping the switch 464, etc.

Ideally, constant velocity of the bridge and attached devices is desired; however, practical considerations of acceleration and deceleration times plus component constructions and load forces dictates that the hydraulic system be so constructed and arranged to provide substantially constant velocity through the scanning path exclusive of overlap portions, in which portions deceleration and acceleration of the bridge and attached components occur. It is to be noted that the interlocked substantially constant velocity paths provide for scanning the entire transverse dimension of the glass.

*Scanning pattern*

Attention is now directed to FIG. 13 showing the scanning pattern of the subject scanning device relative to the glass G. The combined movement of the glass and the reciprocations transverse of the glass by each scanner assembly provides a substantially zig-zag path of a predetermined width, as indicated. Because of the placement of the scanners on the bridge B an overlap of adjacent patterns and an overlap of pattern beyond the edges of the glass are provided. These overlapping patterns are paths in which acceleration and deceleration of the bridge occur, as previously explained. Because of the nature of Type B defects, i.e., about 6 inches in longitudinal dimensions, generally accepted glass cutting practices and probability studies, the scanning envelope ranges from 15 to 25% of the total area of the glass. It is highly improbable the defects will be completely missed by the scanning pattern and thus be contained in a final cut piece of glass.

*Circuitry, circuitry operation and functions*

Turning now to FIG. 14, the schematic block diagram showing a complete scanning assembly, of which there are a plurality in the system, we see the relation of the light source S and associated parts and the scanning device to the glass G. There is also indicated a high voltage D.C. source, a preamplifier, preferably of the cathode follower variety, a rectifier and a discriminator. Each of these electrical components is of conventional construction and requires no detailed description of specific circuits. Note that, if desired, an oscilloscope may be included, so that a signal pattern can be visually observed. The signal pattern shown on the oscilloscope screen in the drawing is a typical pattern when Type B defects are present in the glass being inspected.

The light intensity variations, as seen by the slit s, are picked up by the light sensitive element, the photomultiplier tube T, which generates a voltage of varying amplitude and frequency directly related to the defect severity in the inspected glass. The high voltage D.C. supply furnishes the voltage for the tube's dinodes and the necessary plate voltage. The signals generated by the tube T, a pattern of which may be visually observed on the screen of the oscilloscope, are amplified to a desired level by the preamplifier preferably placed in close proximity to the tube T, to amplify the low level signals before they are subjected to external disturbances, such as stray voltage pickup. A cathode-follower variety of preamplifier is preferably used, so that the signals may be transferred through long lines without danger of losing high frequency response to line capacity. Also, the use of the cathode follower reduces the possibility of stray A.C. pickup and cross talk.

The rectifier is composed of a full wave rectifier which converts the A.C. signals fed from the preamplifier to pulsating D.C. signals.

The discriminator receives the rectified signals and supplies information to a device or devices for use in determining the optimum cutting of the glass into commercial size sheets. Because there are three qualities of glass, i.e., mirror, glazing and total reject, the discriminator must supply information related to defect severity. Thus, the information supplied is in the form of signals indicating mirror reject quality and total reject quality.

To provide the desired information, the discriminator includes comparator circuits which compare the rectified signals fed thereto with preset voltages representing severity rejection levels. Establishment of the preset voltages is determined from knowledge of acceptable quality levels.

*Operation*

The defects of Type B, as previously stated, exist within the body of polished plate glass and result from incomplete blending of the various batch ingredients during the glass melting and fining operations. Defects of this type are generally elongated in the direction of the travel of the glass and will diffuse light from an otherwise predetermined path.

In other words, defects of Type B will, if present in the body of glass, refract light that is intersected by the glass.

Also, as previously set forth, if placed at the proper distances, one on either side of a specimen, a screen and a point source of light will produce a shadowgraph. Defects in the glass of Type B will cause areas to have a light intensity higher than the normal background and areas to have a light intensity lower than the normal background. These areas of different light intensities than normal will be aligned in the direction of the draw of the glass. In the scanning device described herein, the disc D has been substituted for the screen and its elongated slit s is positioned to extend in the same direction as the defects. The slit s intercepts increments of light flux dependent on the shadowgraph presentation at the plane of the disc D or, stated somewhat differently, the disc interrupts the beam of light and the slit permits only a small portion thereof to pass. Thus, the slit sees changes in light intensity as the disc moves relative to the glass. The light passing through the slit impinges on the photosensitive element, such as the described photomultiplier tube T.

The photomultiplier tube converts the light into usable electrical energy which is directly proportional to the light transmitted by the slit. The scanning device, as illustrated, is angled relative to the glass. It has been found that when so angled, approximately 60 degrees from the vertical, the modulation effects of the defects are enhanced.

The electrical energy in the form of signals of varying amplitude and frequencies due to the variation in intensities, dependent on defect severity, are amplified and rectified and then fed to the discriminator which supplies signals indicative of glass quality. The latter signals are fed into a device or devices for ultimate use in determining the optimum cutting of the glass. Such device or devices may include a recorder or a storage device which feed the information upon demand to a computer or to a marking device which marks defect areas directly on the glass. The signals indicating severity and location of defects are, by electrical, mechanical or electro-mechanical means correlated with the corresponding areas of the inspected glass in a manner relating to generally accepted cutting practices, so that the end result is the determination of defect severity and location in a matrix of a desired, usually predetermined size.

For inspecting a ribbon or plate of glass 127 inches in width, traveling on the conveyor at speeds of 3.6 inches/second or 5 inches/second, depending on the thickness of the glass, i.e., ¼ inch and ⅛ inch, respectively, four scanning assemblies are employed. Each scanning assembly has a total scanning coverage of 40 inches and a usable scanning coverage of 32 inches, the difference between total and usable scanning coverage being the overlap of pattern as described. Thus, the scanning assemblies are mounted on the bridge on 32 inch centers, and the full stroke of the bridge is 40 inches with a usable stroke of 32 inches. The velocity of the bridge is a substantially uniform 24 inches/second except for the portions in which acceleration and deceleration occur. Each disc D of each scanning assembly, as previously stated, is provided with a scanning slit having a length of 0.75 inch and a width of 0.020 inch. The dimensions and speeds described provide the desired scanning coverage, as explained.

The scanning device described is capable of modification in manners apparent to one skilled in the art. Both the scanner and the light source could be positioned adjacent to one surface of the glass, so that instead of passing light through the glass, light would be reflected from a bottom surface thereof through the glass, probably requiring a reflective coating adjacent the bottom surface of the glass.

A scanning device, such as that described, may be used for quality control operations without being mounted on a bridge adjacent the path of movement of the glass. In such use, random samples of glass would be inserted between the light source and the scanner, so as to obtain electrical signals indicating the presence of defects. Readings of such signals are indicative of the quality of glass being produced and could indicate that adjustments of the melting apparatus is desirable.

The foregoing invention has been described with particular reference to the inspection of ground and polished plate glass for determining the location and severity of the various enumerated defects. The invention may, however, be used to locate defects of similar nature, i.e., size, distribution, optical properties, etc., which may impair the quality of other materials, for example, sheet glass, plastics and other materials of various shapes and forms.

We claim:

1. A method of detecting the presence of defects in bodies of glass in sheet and ribbon form resulting from the incomplete blending of various glass ingredients during the glass melting and fining operations that are generally elongated in one direction and refract light comprising, transmitting a beam of light from a light source, supporting glass in the path of said beam of light so that it intersects said beam, interrupting the beam of light so as to permit a small portion only thereof elongated in the same direction as the defects to pass, and impinging the small portion of light upon a light sensitive element, said light sensitive element being responsive to variations from a given intensity of said small portion of light caused by refraction and providing signals indicative of the presence of such defects within the glass intersecting said small portion of light.

2. A method as recited in claim 1 further including moving said supported glass along a path in one direction, and moving said light source and said light sensitive element in unison through a path substantially transverse to the path of said glass, so as to scan said glass across its width for the presence of said defects.

3. A method as in claim 1 wherein said light has a given intensity, further including electrically comparing said signals with predetermined signal levels to determine the severity of the defects present in the glass.

4. Apparatus for detecting the presence of defects in bodies of glass in sheet and ribbon form resulting from the incomplete blending of various glass ingredients during the glass melting and fining operations that are generally elongated in one direction and refract light comprising, a source of light adapted to transmit a beam of light of a given intensity, a conveyor for supporting and transporting glass through the path of said beam so that said glass intersects said beam, a light sensitive element aligned with said beam, and means in the path of light between said source and said light sensitive element to interrupt the major portion of said light beam and having a relatively narrow elongated slit therein to permit a small portion only of said light beam to impinge upon said light sensitive element, said slit being elongated in the same direction as said defects, said light sensitive element being responsive to variations from said given intensity of said small portion of light beam impinging thereon caused by refraction and thereby providing signals indicative of the presence and severity of such defects in the glass intersecting said small portion of light, and means to compare said signals with predetermined signal levels to determine the severity of such defects detected.

5. Apparatus for detecting the presence of defects in bodies of glass in sheet and ribbon form resulting from the incomplete blending of various glass ingredients during the glass melting and fining operations that are generally elongated in one direction and refract light comprising, a source of light adapted to transmit a beam of light of a given intensity, a conveyor for supporting and transporting glass through the path of said beam so that said glass intersects said beam, a light sensitive element aligned with said beam, means in the path of light between said source and said light sensitive element to interrupt the major portion of said light beam and having a relatively narrow elongated slit therein to permit a small portion only of said light beam to impinge upon said light sensitive element, said slit being elongated in the same direction as said defects, said light sensitive element being responsive to variations from said given intensity of said small portion of light beam impinging thereon caused by refraction and thereby providing a signal indicative of the presence and severity of such defects in the glass intersecting said small portion of light, and means to move said light source and said interrupting means and said light sensitive means transversely of said conveyor so as to detect the presence of such defects in a zig-zag volume of the glass.

6. Apparatus as recited in claim 5, wherein said light source is so constructed and arranged to direct its beam of light at an acute angle relative to the plane of the glass, so as to increase the aberration characteristics of the defects.

7. Apparatus as recited in claim 5, wherein there are a plurality of sets of light sources and light sensitive elements and interrupting means arranged transversely of the path of the glass, each said set arranged for detecting the presence of the defects in a longitudinal portion of the glass.

8. A method of detecting the presence of defects in bodies of glass in sheet and ribbon form resulting from the incomplete blending of various glass ingredients during the glass melting and fining operations that are generally elongated in one direction and refract light comprising presenting a shadowgraph of said glass at a predetermined plane, said shadowgraph having areas of different intensities than normal when such defects are present in the glass due to light refraction, blocking major portions of said shadowgraph at said predetermined plane, allowing increments of light flux elongated in the same direction as the defects on said shadowgraph presentation to pass said plane, impinging said increments of light flux onto a light sensitive element which provides signals proportional to said different intensity light impinging thereon and thus indicative of the presence of such defects.

9. A method as recited in claim 8 further electrically comparing said signals with preset signal levels to determine the severity of such defects.

10. A method as recited in claim 8, further including providing relative motion between said glass and said light sensitive element.

11. A method as recited in claim 8, further including moving said glass along a path in one direction and moving said light sensitive element through a path substantially transverse the path of said glass, so as to scan said glass across its width for the presence of glass defects.

12. Apparatus for detecting the presence of defects in bodies of glass in sheet and ribbon form resulting from the incomplete blending of various glass ingredients during the glass melting and fining operations that are generally elongated in one direction and refract light comprising, means to provide a shadowgraph presentation of the glass at a predetermined plane, said shadowgraph presentation having areas of different light intensities than normal when such defects are present in the glass; means at said predetermined plane to intercept portions of said shadowgraph presentation and to permit incremental portions elongated in the same direction as said defects to pass said plane; and means, including a light sensitive element spaced from said plane to provide signals proportional to said different intensity light impinging thereon to indicate the presence of said defects.

13. Apparatus as recited in claim 12, wherein said means to intercept increments of light flux on said shadowgraph presentation and allowing them to pass said plane includes a disc having an elongated slit therein, said slit being elongated in the same direction as the defects.

14. Apparatus as recited in claim 13, further including means to compare said signals with preset signal levels to determine the severity of such defects.

15. Apparatus as recited in claim 14, further including means to provide relative motion between said glass and said light sensitive element.

16. Apparatus as recited in claim 14, wherein means are provided to move said glass along a predetermined path and to move said light sensitive element substantially transverse to the path of said glass.

17. A method of detecting the presence of defects in bodies of glass in sheet and ribbon form resulting from the incomplete blending of various glass ingredients during the glass melting and fininig operations that are generally elongated in one direction and refract light, comprising the steps of transmitting a beam of light from a point source through the glass to be inspected, masking out said beam except for a slit of light elongated in the same direction as the defects, electrically comparing the intensity of said slit of light to a predetermined light intensity for defect-free glass so as to detect intensity variations caused by defects within said glass, and making a signal in response to the direction of said variations in intensity.

18. A method of detecting the presence of defects in bodies of glass in sheet and ribbon form resulting from the incomplete blending of various glass ingredients during the glass melting and fining operations that are generally elongated in one direction and refract light, comprising the steps of transmitting a beam of light from a point source through the glass to be inspected and at an acute angle to said glass, masking out said beam except for a slit of light elongated in the same direction as the defects, electrically comparing the intensity of said slit of light to predetermined light intensities for at least two different qualities of glass so as to detect intensity variations caused by defects within said glass, and making signals in response to the detection of said variations in intensity indicative of the severity of said defects.

19. Apparatus for detecting the presence of defects in bodies of transparent glass resulting from the incomplete blending of various glass ingredients during the glass melting and fining operations that are generally elongated in one direction and refract light comprising, a source of light adapted to transmit a beam of light; means for supporting glass in the path of said beam so that said glass intersects said beam; means, including a light sensitive element, responsive to said light beam to receive a portion of said beam and to provide signals indicative of the presence of said defects in the glass intersecting said portion of said light beam; and means in the path of said beam of light between said source and said light sensitive element to interrupt the light beam and permit a small portion only of said light beam elongated in the same direction as said defects to impinge upon said light sensitive element.

20. Apparatus for detecting the presence of defects in bodies of glass in sheet and ribbon form resulting from the incomplete blending of various glass ingredients during the glass melting and fining operations that are generally elongated in one direction and refract light comprising, a source of light adapted to transmit a beam of light of a given intensity; means for supporting glass in the path of said beam so that said glass intersects said beam; means, including a light sensitive element aligned with said beam, responsive to variations from said given intensity of an impinging portion of said light beam to provide signals indicative of the presence and severity of said defects in the glass intersecting said portion of said light beam; and a perforate element in the path of light between said source and said light sensitive element to interrupt the major portion of said light beam and permit a small portion only of said light beam elongated in the same direction as said defects to impinge upon said light sensitive element.

21. A method of detecting the presence of defects in bodies of glass in sheet and ribbon form, resulting from the incomplete blending of various glass ingredients during the glass melting and fining operations, that are generally elongated in one direction and refract light, comprising: scanning said glass by projecting a beam of light therethrough, examining with said beam of light only incremental portions of the glass that are correlated in dimensions with and are elongated in the direction of said defects, said beam being refracted by said defects and thereby indicating the presence thereof; sensing, in progressive incremental portions of said glass, variations in light intensity caused by said refraction of said beam so as to detect the presence of said defects in said glass; and electrically comparing the intensity of said variations with predetermined values of light intensity to determine the severity of said defects.

References Cited by the Examiner

UNITED STATES PATENTS

| | | | |
|---|---|---|---|
| 1,849,881 | 3/32 | Person | 88—14 X |
| 1,874,217 | 8/32 | Arbury | 88—14 |
| 2,046,045 | 6/36 | Walters | 88—14 |
| 2,393,631 | 1/46 | Harrison et al. | 88—14 X |
| 2,593,127 | 3/52 | Fedorchak | 88—14 |
| 2,708,857 | 5/55 | Golding | 88—14 |
| 2,735,331 | 2/56 | McMaster et al. | 88—14 |
| 2,798,605 | 7/57 | Richards. | |
| 3,030,516 | 4/62 | Seavey | 88—14 X |
| 3,067,872 | 12/62 | Fouse et al. | |
| 3,069,553 | 12/62 | Zoltanski. | |

FOREIGN PATENTS

| | | |
|---|---|---|
| 974,768 | 11/48 | France. |
| 1,180,461 | 12/58 | France. |

JEWELL H. PEDERSEN, *Primary Examiner.*

WILLIAM MISIEK, EMIL G. ANDERSON, FREDERICK M. STRADER, *Examiners.*